United States Patent
Wu

(10) Patent No.: US 10,288,202 B2
(45) Date of Patent: May 14, 2019

(54) INSTALLATION BETWEEN VALVE CONNECTOR AND PIPE OF ICE MAKER

(71) Applicants: CHENG YU FAUCET HARDWARE CO., LTD., Changhua County (TW); YUYANG HARDWARE CO., LTD., Changhua County (TW); Chin-Yu Wu, Changhua County (TW)

(72) Inventor: Chin-Yu Wu, Changhua County (TW)

(73) Assignees: Cheng Yu Faucet Hardware Co., Ltd., Changhua County (TW); Yuyang Hardware Co., Ltd., Changhua County (TW); Chin-Yu Wu, Changhua County (TW)

( * ) Notice: Subject to any disclaimer, the term of this patent is extended or adjusted under 35 U.S.C. 154(b) by 0 days.

(21) Appl. No.: 15/674,756

(22) Filed: Aug. 11, 2017

(65) Prior Publication Data

US 2019/0049050 A1  Feb. 14, 2019

(51) Int. Cl.
*F25C 1/25* (2018.01)
*F16L 37/092* (2006.01)
*F16K 5/04* (2006.01)
*F16L 37/12* (2006.01)

(52) U.S. Cl.
CPC ........ *F16L 37/0925* (2013.01); *F16K 5/0414* (2013.01); *F16L 37/122* (2013.01); *F25C 1/25* (2018.01)

(58) Field of Classification Search
CPC ....... F16L 37/122; F16L 37/12; F16L 37/084; F16L 37/088; F16L 37/091; F16L 37/092; F16L 37/0925; F16K 5/0414; F25C 1/25

USPC ......... 251/151, 150, 148, 309–311; 285/243, 285/322, 323
See application file for complete search history.

(56) References Cited

U.S. PATENT DOCUMENTS

| | | | | | |
|---|---|---|---|---|---|
| 2,631,002 | A | * | 3/1953 | Mueller | F16K 5/0414 251/310 |
| 3,999,783 | A | * | 12/1976 | Legris | F16L 37/0925 285/24 |
| 4,262,880 | A | * | 4/1981 | Danko | F16K 5/0407 251/209 |
| 4,958,858 | A | * | 9/1990 | Guest | F16L 37/092 285/24 |
| 5,230,539 | A | * | 7/1993 | Olson | F16L 37/0925 285/243 |
| 5,474,336 | A | * | 12/1995 | Hoff | F16L 37/02 138/89 |

(Continued)

*Primary Examiner* — Reinaldo Sanchez-Medina
*Assistant Examiner* — David Colon-Morales
(74) *Attorney, Agent, or Firm* — Rosenberg, Klein & Lee

(57) ABSTRACT

An installation of a water supply pipe and a valve connector of an ice maker includes a valve connector with an inlet tube extending therefrom which communicates with a water supply hole in the body. The inlet tube has a first flange extending inward therefrom. A sleeve is inserted into the inlet tube and includes a shank and a second flange extending outward from the first end thereof. The sleeve extends through a seal ring which contacts the inside of the inlet tube. A tube adapter is inserted into the inlet tube and includes a passage defined through the tubular portion of the tube adapter. The tubular portion includes multiple pawls. Each pawl has a hook portion. A water supply pipe is inserted into the passage and clamped by the pawls.

3 Claims, 4 Drawing Sheets

(56) References Cited

U.S. PATENT DOCUMENTS

| | | | | |
|---|---|---|---|---|
| 5,683,120 A * | 11/1997 | Brock | ............... | F16L 37/0925 285/148.21 |
| 5,695,169 A * | 12/1997 | Higgins | ............... | F16K 5/0414 16/441 |
| 5,775,742 A * | 7/1998 | Guest | ............... | F16L 37/0925 285/322 |
| 6,086,044 A * | 7/2000 | Guest | ............... | F16L 37/0925 251/148 |
| 6,213,149 B1 * | 4/2001 | Moner | ............... | F16K 5/0414 137/556.3 |
| 7,036,793 B2 * | 5/2006 | Turnau, III | ............... | F16K 5/0414 251/175 |
| 7,455,280 B2 * | 11/2008 | Parrish | ............... | F16L 37/0925 251/149.1 |
| 7,497,415 B2 * | 3/2009 | Chang | ............... | F16K 5/0414 251/310 |
| 8,056,939 B2 * | 11/2011 | Lechner | ............... | F16L 37/0925 285/243 |
| 8,287,006 B2 * | 10/2012 | Pedersen | ............... | F16L 37/0925 285/104 |
| 8,403,370 B2 * | 3/2013 | Choi | ............... | F16K 27/065 137/862 |
| 8,851,524 B2 * | 10/2014 | Roberts | ............... | F16L 37/0925 285/243 |
| 2009/0058082 A1 * | 3/2009 | Green | ............... | E03C 1/021 285/222.1 |
| 2009/0102184 A1 * | 4/2009 | Lechner | ............... | F16L 33/227 285/33 |
| 2009/0282855 A1 * | 11/2009 | Maples | ............... | F25C 1/147 62/344 |
| 2010/0170579 A1 * | 7/2010 | Wu | ............... | E03C 1/0403 137/315.01 |
| 2010/0187811 A1 * | 7/2010 | Topping | ............... | F16L 27/0849 285/148.4 |
| 2011/0012350 A1 * | 1/2011 | Camozzi | ............... | B60T 17/043 285/348 |
| 2011/0233437 A1 * | 9/2011 | Mattson | ............... | F16K 5/0478 251/309 |
| 2012/0104749 A1 * | 5/2012 | Kang | ............... | F16L 37/0925 285/323 |
| 2012/0312404 A1 * | 12/2012 | Choi | ............... | F16L 19/065 137/883 |
| 2013/0037731 A1 * | 2/2013 | Athanasiou | ............... | F16K 31/02 251/129.01 |
| 2016/0033050 A1 * | 2/2016 | Ferrer Beltran | ...... | F16K 11/085 137/625.46 |
| 2016/0290697 A1 * | 10/2016 | Broadbent | ............... | B08B 9/00 |
| 2017/0176077 A1 * | 6/2017 | Knatt | ............... | F25C 1/25 |
| 2018/0080589 A1 * | 3/2018 | Heon | ............... | F16L 37/0925 |

* cited by examiner

INSTALLATION BETWEEN VALVE CONNECTOR AND PIPE OF ICE MAKER

BACKGROUND OF THE INVENTION

1. Fields of the Invention

The present invention relates to a connection of a valve connector and a water supply pipe of an ice maker without using threads.

2. Descriptions of Related Art

The conventional ice makers comprises a valve connector which is connected with a water supply pipe, and water is introduced into the ice maker to be made into ice. The conventional valve connector includes an inlet tube extending from the body of the valve connector, and the water supply pipe is connected to the inlet tube. The inlet tube includes outer threads and the water supply pipe is threadedly connected to the outer threads of the inlet tube. Some of the water supply pipe is cooperated with securing device including tapered pieces and seal ring to secure the connection between the water supply pipe and the inlet tube. However, there are tolerances formed between the outer threads of the inlet tube and the inner threads of the water supply pipe, so that water usually leaks from the connection between the inner and outer threads.

The present invention intends to provide an installation between the valve connector and the water supply pipe of an ice maker without using threads so as to eliminate the shortcomings mentioned above.

SUMMARY OF THE INVENTION

The present invention relates to an installation of a water supply pipe and a valve connector of an ice maker, and comprises a valve connector having a body, and a handle is rotatably connected to the top of the body. An inlet tube extends from one side of the body and has a first flange extending inward from the inner periphery of the distal end thereof. The inner diameter of the first flange is smaller than that of the inside of the inlet tube. A water supply hole is defined in communication between the body and the inlet tube.

A sleeve is inserted into the inlet tube and has a shank. A second flange extends outward from the first end of the shank. The shank extends through a seal ring which is located in the inlet tube and contacts the inside of the inlet tube.

A tube adapter is inserted into the inlet tube and has a tubular portion, and a passage is defined through the tube adapter. The tubular portion has multiple slots defined axially to form multiple pawls. The slots communicate with the passage. Each pawl has a hook portion formed at the first end of the tube adapter. A head extends outward from the second end of the tube adapter. The shank of the sleeve extends through the passage. The head of the tube adapter is located on outside of the first flange and contacts the end face of the first flange.

A water supply pipe is inserted into the passage and mounted to the shank. The hook portions of the pawls of the tube adapter are restricted by the first flange to prevent the sleeve, the tube adapter and the water supply pipe from dropping from the inlet tube.

The advantages of the present invention are that the water supply pipe is mounted to the outside of the sleeve, and clamped by the tube adapter so that the water supply pipe does not need threads to be connected to the valve connector. The cost for manufacturing threads is saved.

The water supply pipe is clamped between the sleeve and the tube adapter, so that the water supply pipe is secured.

The pawls of the tube adapter each include a hook portion, and are expand outward when the water supply pipe is inserted into the passage of the tube adapter. The hook portions are restricted by the first flange of the inlet tube so that when the tube adapter and the water supply pipe are axially moved in the inlet tube, the water supply pipe does not drop from the inlet tube.

The seal ring located adjacent to the water supply hole to prevent leakage.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
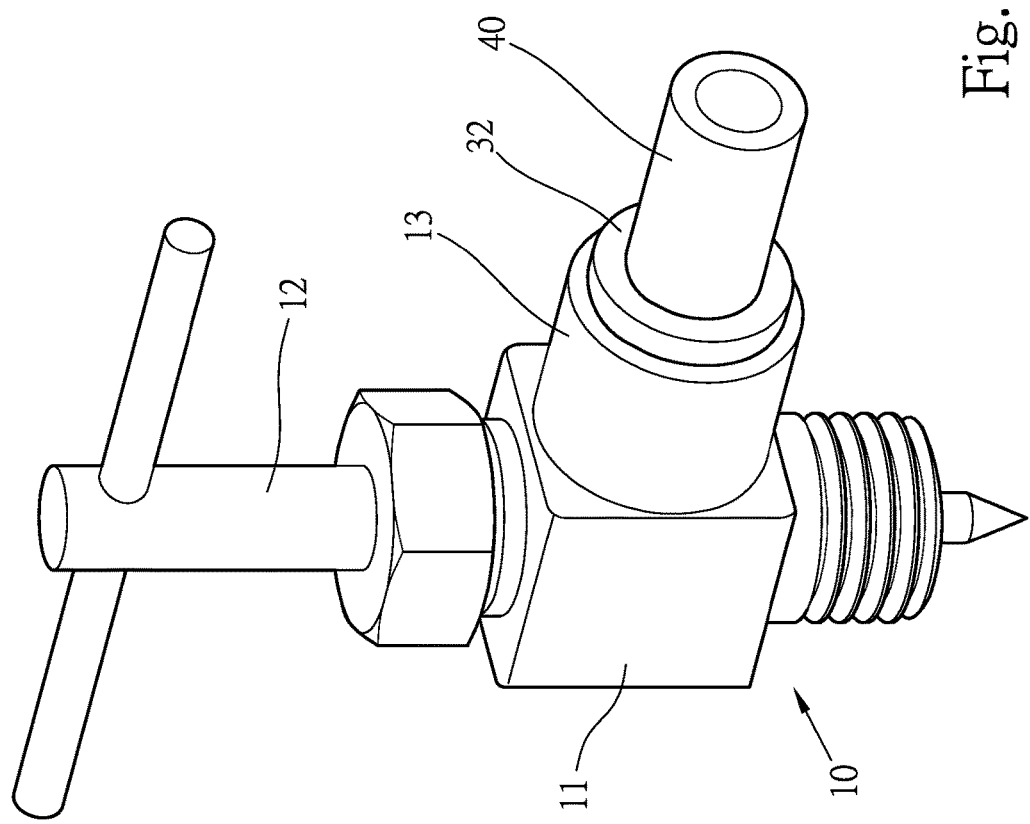
FIG. 1 is a perspective view to show the combination of the valve connector, the sleeve, the tube adapter and the water supply pipe of the present invention.
Figure 2:
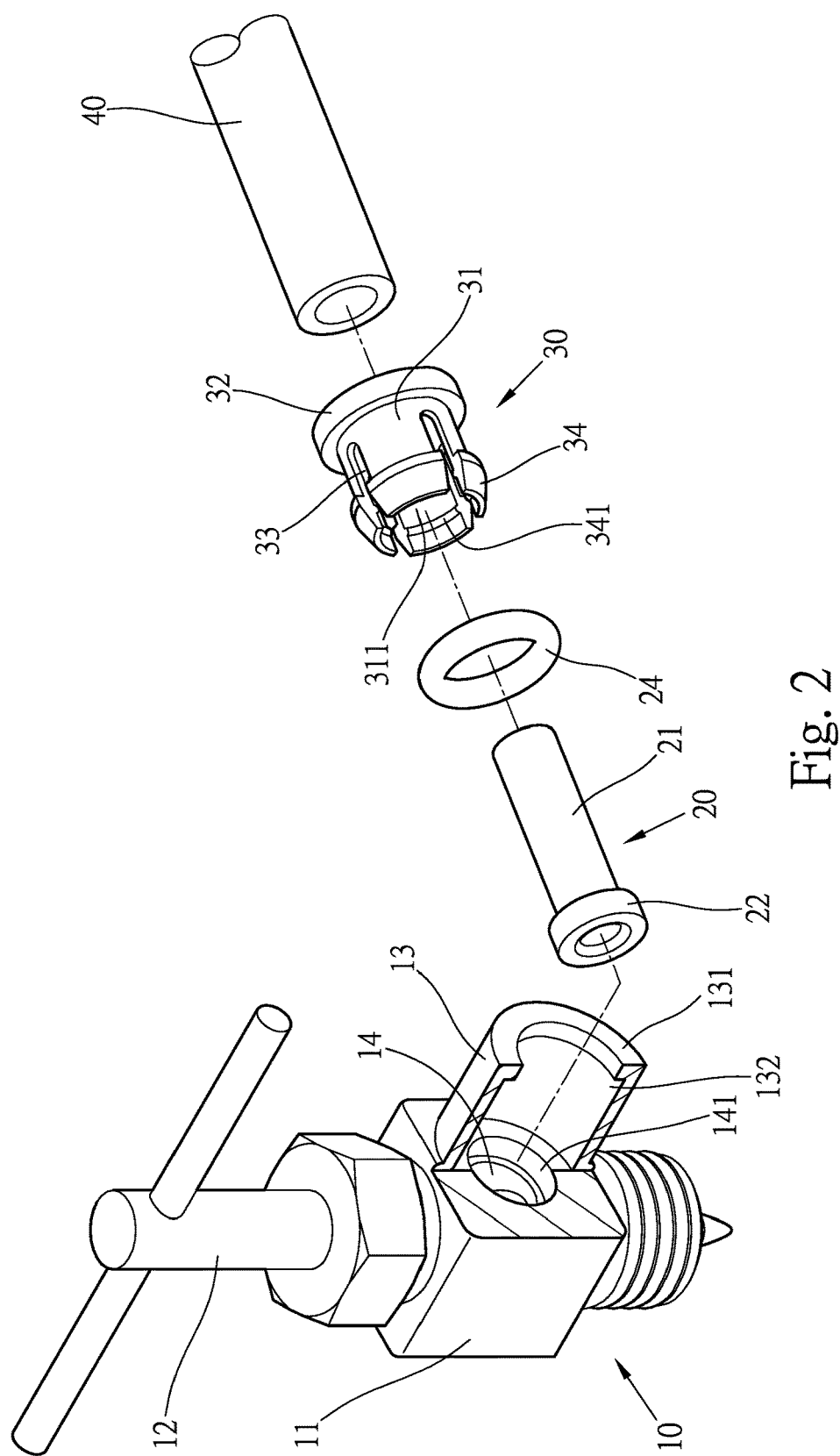
FIG. 2 is an exploded view of the valve connector, the sleeve, the tube adapter and the water supply pipe of the present invention.
Figure 3:
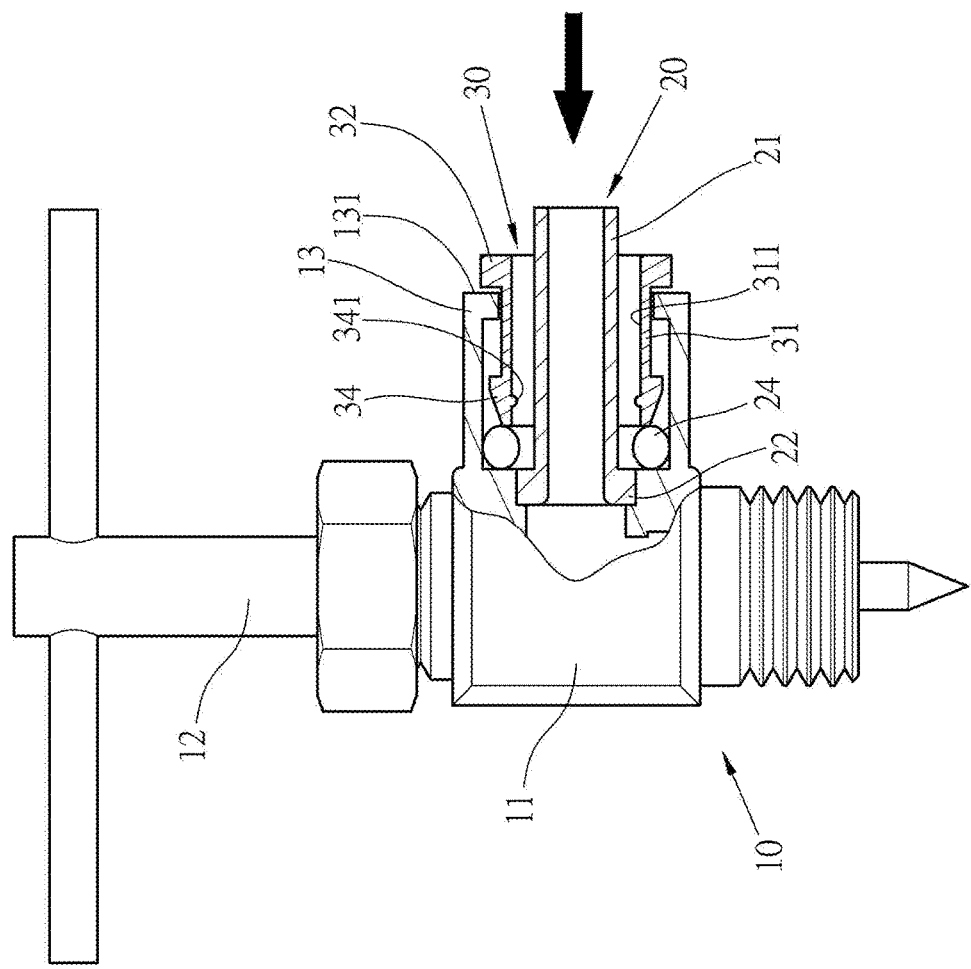
FIG. 3 is a cross sectional view of the combination of the valve connector, the sleeve and the tube adapter, wherein the water supply pipe is to be inserted into the tube adapter.

Referring to FIGS. 1 to 3, the installation of a water supply pipe and a valve connector of an ice maker of the present invention comprises a valve connector 10 having a body 11, and a handle 12 is rotatably connected to the top of the body 10. An inlet tube 13 extends from one side of the body 11 and has a first flange 131 extending inward from the inner periphery of the distal end thereof. The inner diameter of the first flange 131 is smaller than that of the inside 132 of the inlet tube 13. A water supply hole 14 is defined in communication between the body 10 and the inlet tube 13. An enlarged recess 141 is defined in the inner periphery of the water supply hole 14.

A sleeve 20 is inserted into the inlet tube 13 and has a shank 21. A second flange 22 extends outward from the first end of the shank 21. The first end of the shank 21 is inserted into the inlet tube 13 and the shank 21 extends through a seal ring 24 which is located in the inlet tube 13 and contacts the inside 132 of the inlet tube 13. The second flange 22 of the sleeve 20 is engaged with the enlarged recess 141. A portion of the seal ring 24 also contacts the shoulder portion formed between the inside 132 of the inlet tube 13 and a portion of the body 11 that defines the water supply hole 141.

A tube adapter 30 is inserted into the inlet tube 13 and has a tubular portion 31, and a passage 311 is defined through the tube adapter 30. The tubular portion 31 has multiple slots 33 defined axially to form multiple pawls which are expandable outward because of the slots 33. The slots 33 communicate with the passage 311. Each pawl has a hook portion 34 formed at the outside of the first end of the tube adapter 30.

A head 32 extends outward from the second end of the tube adapter 30. The shank 21 of the sleeve 20 extends through the passage 311. The head 32 of the tube adapter 30 is located on outside of the first flange 131 and contacts the end face of the first flange 131. Each of the pawl includes a rib 341 extending radially from the inner periphery thereof and located corresponding to the hook portion 34 corresponding thereto.

Figure 4:
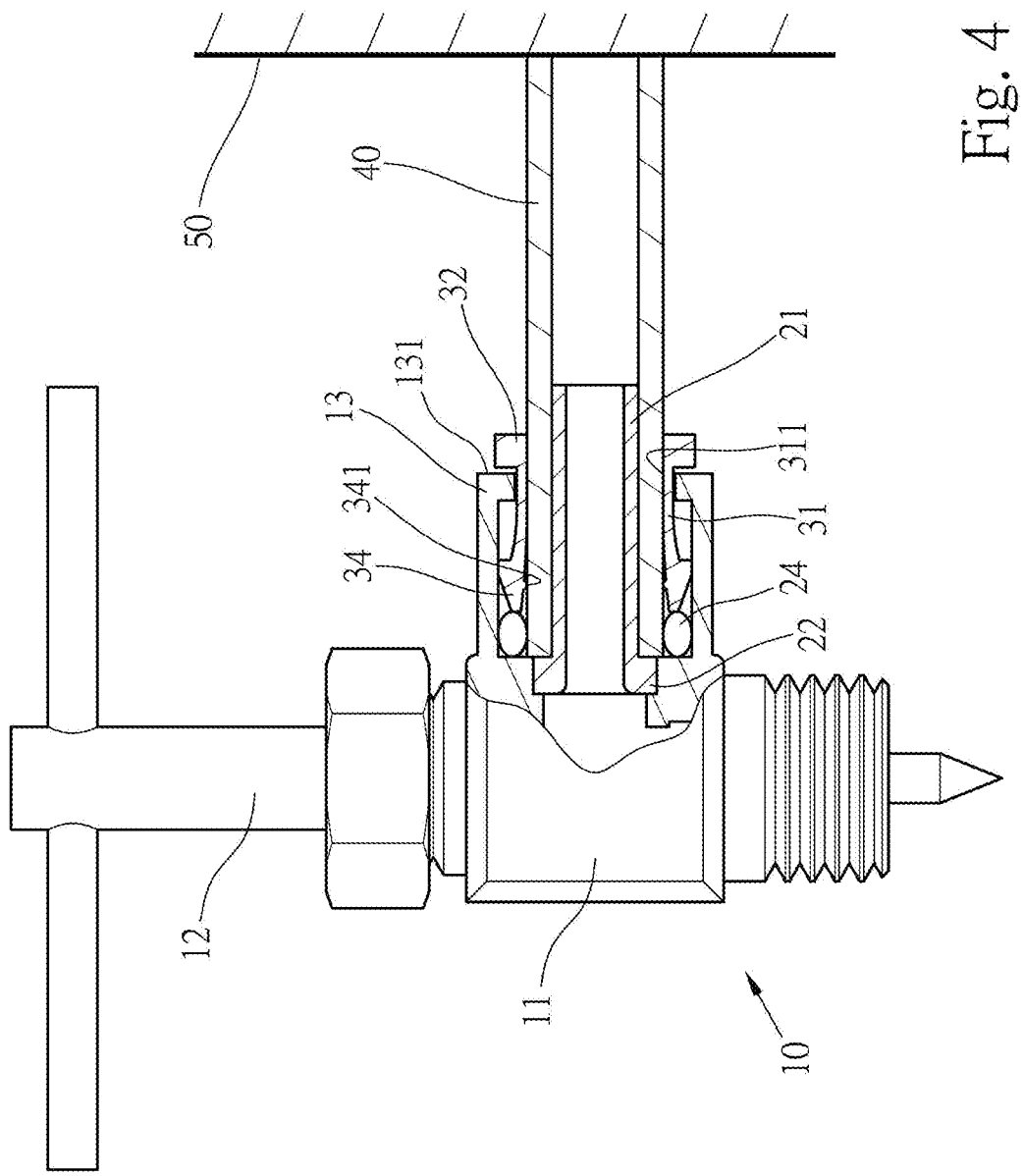
FIG. 4 is a cross sectional view to show the combination of the valve connector, the sleeve, the tube adapter and the water supply pipe of the present invention.

A water supply pipe 40 which extends from an ice maker 50 is inserted into the passage 311 and mounted to the shank 21. As shown in FIG. 4, when the water supply pipe 40 is inserted into the passage 311, the outer diameter of the water supply pipe 40 is slightly larger than the inner diameter of the passage 311, so that the pawls securely clamp the water supply pipe 40, and the pawls are expanded outward. The ribs 341 of the pawls contact against the outside of the water supply pipe 40. The hook portions 34 of the pawls of the tube adapter 30 are restricted by the first flange 131 to prevent the sleeve 20, the tube adapter 30 and the water supply pipe 40 from dropping from the inlet tube 13. The seal ring 24 is compressed between the water supply pipe 40, the inside of the inlet tube 13 and the shoulder portion mentioned above so as to prevent water leakage.

While we have shown and described the embodiment in accordance with the present invention, it should be clear to those skilled in the art that further embodiments may be made without departing from the scope of the present invention.

What is claimed is:

1. An ice maker valve installation comprising:
   a valve connector having a body and a handle rotatably connected to the body, an inlet tube extending from one side of the body and having a first flange extending inward from an inner periphery of a distal end thereof, an inner diameter of the first flange being smaller than that of an inside of the inlet tube, a water supply hole defined in communication between the body and the inlet tube, a shoulder portion formed between the inside of the inlet tube and a portion of the body defining the water supply hole;
   a sleeve inserted into the inlet tube and having a shank, a second flange extending outward from a first end of the shank to form a substantially even surface with the shoulder portion, the shank extending through a seal ring which contacts the inside of the inlet tube and the shoulder portion;
   a tube adapter inserted into the inlet tube and having a tubular portion and a passage defined through the tube adapter, the tubular portion having multiple slots defined axially to form multiple pawls, the slots communicating with the passage, each pawl having a hook portion formed at a first end of the tube adapter, a head extending outward from a second end of the tube adapter, the shank of the sleeve extending through the passage, the head thereby positioned on an outside of the first flange and contacting an end face of the first flange, and
   a water supply pipe inserted into the passage and mounted to the shank, an end of the water supply pipe thereby engaging the shoulder portion and the second flange, the hook portions of the pawls of the tube adapter being restricted by the first flange to prevent the sleeve, the tube adapter and the water supply pipe from dropping from the inlet tube.

2. The ice maker valve installation as claimed in claim 1, wherein
   the body includes an enlarged recess defined in an inner periphery of the water supply hole, and
   the second flange of the sleeve is engaged with the enlarged recess.

3. The ice maker valve installation as claimed in claim 1, wherein each of the pawl includes a rib extending radially from an inner periphery thereof and located corresponding to the hook portion corresponding thereto.

\* \* \* \* \*